(12) United States Patent
Sullivan et al.

(10) Patent No.: US 8,241,378 B2
(45) Date of Patent: *Aug. 14, 2012

(54) CYCLONIC AIR CLEANER ASSEMBLY

(75) Inventors: Ryan A. Sullivan, West Bend, WI (US);
Gary S. Johnson, Hales Corners, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/015,575

(22) Filed: Jan. 27, 2011

(65) Prior Publication Data

US 2011/0120310 A1 May 26, 2011

Related U.S. Application Data

(63) Continuation of application No. 12/259,641, filed on Oct. 28, 2008, now Pat. No. 7,914,609.

(60) Provisional application No. 61/000,790, filed on Oct. 29, 2007.

(51) Int. Cl.
*B01D 45/12* (2006.01)
*B01D 50/00* (2006.01)

(52) U.S. Cl. .......... 55/337; 55/385.3; 55/433; 55/459.1; 55/467; 55/482; 55/DIG. 28

(58) Field of Classification Search ............ 95/268, 95/273; 55/337, 385.3, 433, 459.1, 467, 55/482, DIG. 28

See application file for complete search history.

(56) References Cited

U.S. PATENT DOCUMENTS

| | | | |
|---|---|---|---|
| 2,601,907 A | 7/1952 | Burrows et al. |
| 3,006,437 A | 10/1961 | Lowther |
| 3,077,716 A | 2/1963 | Wilson |
| 3,907,529 A | 9/1975 | Borsheim |
| 4,162,905 A | 7/1979 | Schuler |
| 6,179,890 B1 | 1/2001 | Ramos et al. |
| 6,187,073 B1 | 2/2001 | Gieseke et al. |
| 6,348,084 B1 | 2/2002 | Gieseke et al. |
| 6,419,718 B1 | 7/2002 | Klug et al. |
| 6,424,611 B1 | 7/2002 | Quilling et al. |
| D462,117 S | 8/2002 | Gieseke et al. |
| D471,623 S | 3/2003 | Gieseke et al. |
| 6,547,857 B2 | 4/2003 | Gieseke et al. |
| D477,659 S | 7/2003 | Gieseke et al. |
| 6,681,726 B2 | 1/2004 | Linsbauer et al. |
| 6,746,518 B2 | 6/2004 | Gieseke et al. |
| 6,758,186 B2 | 7/2004 | Janoske |
| 7,001,450 B2 | 2/2006 | Gieseke et al. |
| 7,008,467 B2 | 3/2006 | Krisko et al. |

(Continued)

FOREIGN PATENT DOCUMENTS

DE 4319503 1/1994

(Continued)

OTHER PUBLICATIONS

European Search Report dated Nov. 27, 2009 for European Patent Application No. 08253522.0.

*Primary Examiner* — Robert A Hopkins
(74) *Attorney, Agent, or Firm* — Rathe Lindenbaum LLP

(57) ABSTRACT

An apparatus and method utilize a fan to direct air through a screen to cool an engine. A cyclonic air cleaner assembly receives air from the blower fan and directs the air towards an air-fuel mixing device of the engine.

24 Claims, 7 Drawing Sheets

U.S. PATENT DOCUMENTS

| | | |
|---|---|---|
| 7,017,227 B2 | 3/2006 | Scott |
| 7,070,642 B2 | 7/2006 | Scott et al. |
| 7,211,124 B2 | 5/2007 | Gieseke et al. |
| 7,364,601 B2 | 4/2008 | Xu et al. |
| 7,491,254 B2 | 2/2009 | Krisko et al. |
| 7,524,349 B2 | 4/2009 | Schrage et al. |
| 7,615,091 B2 | 11/2009 | Gieseke et al. |
| 7,637,978 B2 | 12/2009 | Jung |
| 7,645,310 B2 | 1/2010 | Krisko et al. |
| 7,662,203 B2 | 2/2010 | Scott et al. |
| 2002/0189573 A1 | 12/2002 | Janoske |
| 2008/0178592 A1 | 7/2008 | Bering |
| 2009/0100813 A1 | 4/2009 | Iddings et al. |
| 2009/0308250 A1 | 12/2009 | Rotter et al. |
| 2010/0146920 A1 | 6/2010 | Iddings et al. |

FOREIGN PATENT DOCUMENTS

| | | |
|---|---|---|
| DE | 10128790 | 12/2002 |
| EP | 1364696 | 11/2003 |
| EP | 1701030 | 9/2006 |
| WO | WO 0231340 | 4/2002 |

CYCLONIC AIR CLEANER ASSEMBLY

CROSS-REFERENCE TO RELATED PATENT APPLICATIONS

The present application claims priority under 35 U.S.C 120 from and is a continuation of co-pending U.S. patent application Ser. No. 12/259,641 filed on by Ryan Sullivan and Gary Johnson and entitled CYCLONIC AIR CLEANER ASSEMBLY which claims priority from U.S. patent application Ser. No. 61/000,790 filed on Oct. 29, 2007 by Ryan Sullivan and Gary Johnson and entitled CYCLONIC AIR CLEANER ASSEMBLY, the full disclosures of which are hereby incorporated by reference.

BACKGROUND

Typically, cyclonic air cleaning devices are mounted exterior of the engine blower housing and are coupled to a carburetor by way of various connection devices. Rain caps are often needed at the air inlet to prevent rain water from entering the cleaning device, and externally-mounted cleaning devices add bulk to the overall engine package.

DETAILED DESCRIPTION OF THE EXAMPLE EMBODIMENTS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
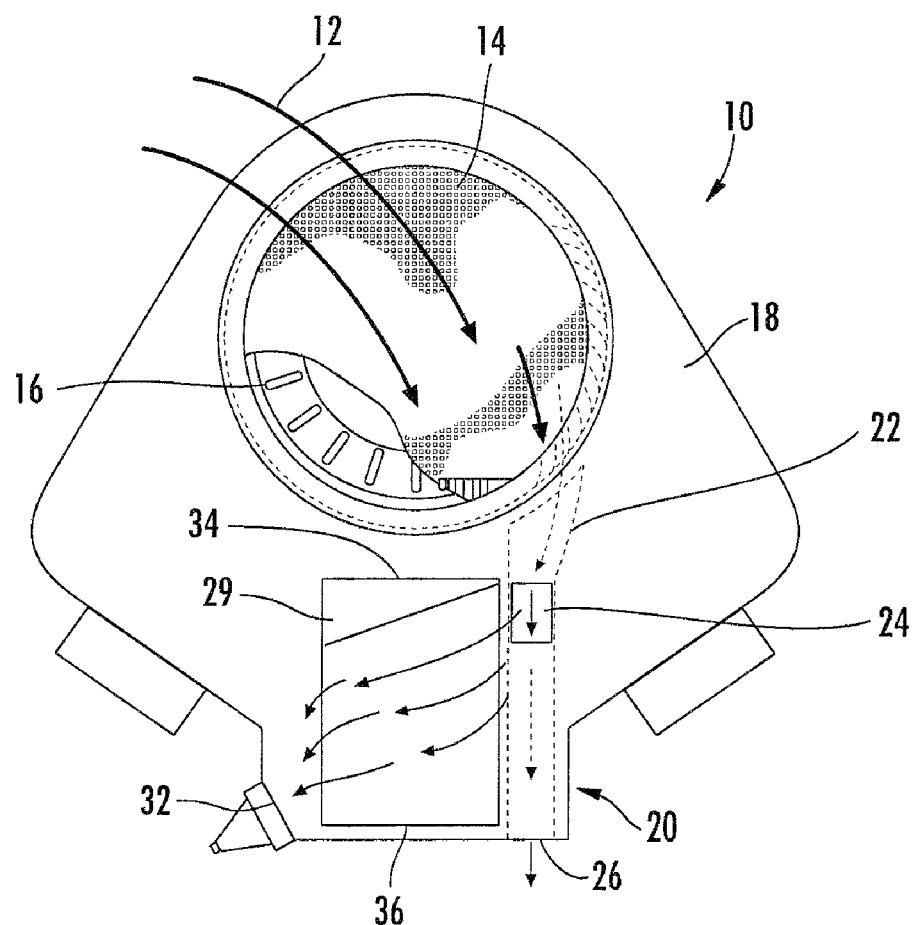
FIG. 1 is a top view of the blower housing, including the air cleaner assembly.
Figure 2:
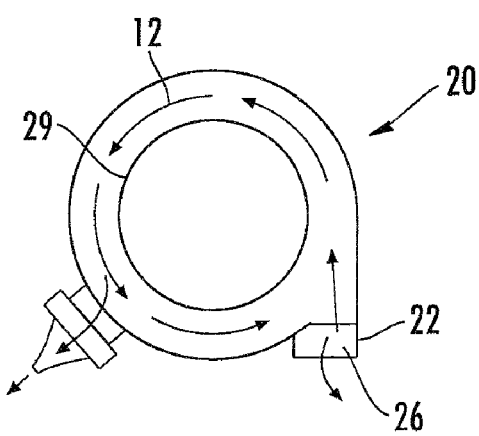
FIG. 2 is a front view of the air cleaner assembly.

FIGS. 1 and 2 illustrate the path of air, represented by arrows 12, that passes through a blower housing 10, which includes an air cleaner assembly 20. The blower housing 10 also includes a rotating screen 14, which provides a first air inlet for the air cleaner assembly of the present invention. The screen 14 is adjacent to an intake portion of a cooling fan 16 in a manner well known to those of ordinary skill in the art. This air inlet configuration eliminates the need for a rain cap because the intake is not directly exposed to the outside environment.

Figure 4:
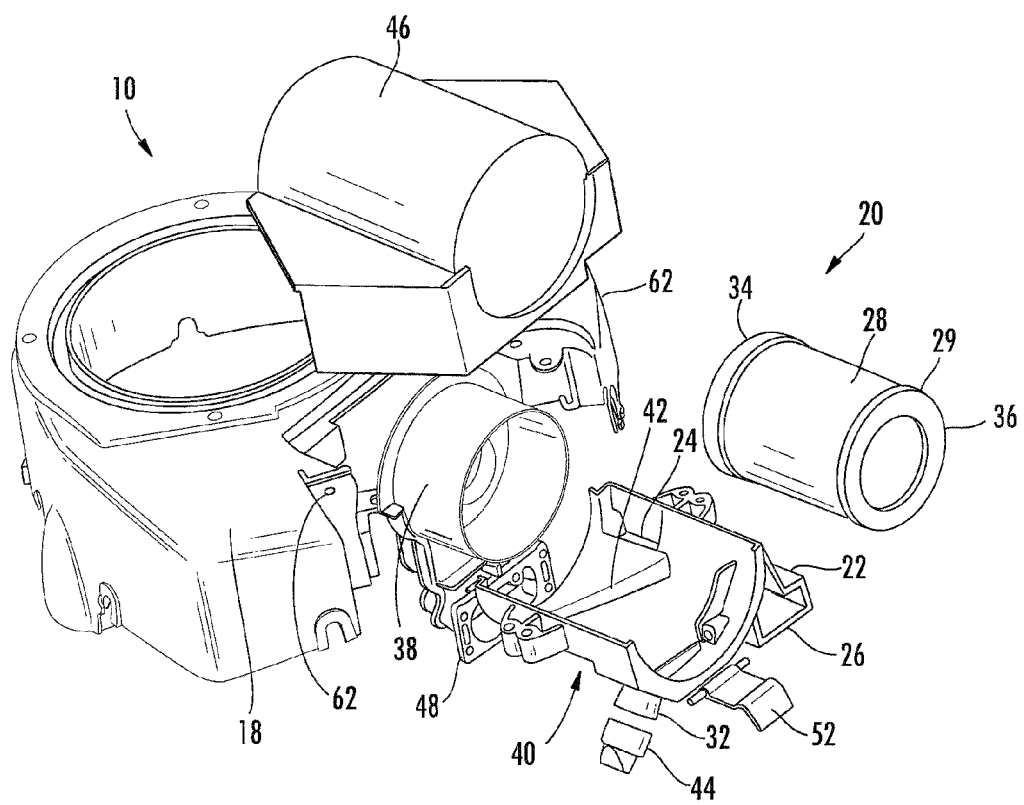
FIG. 4 is an exploded view of the blower housing, including the air cleaner assembly.
Figure 5:
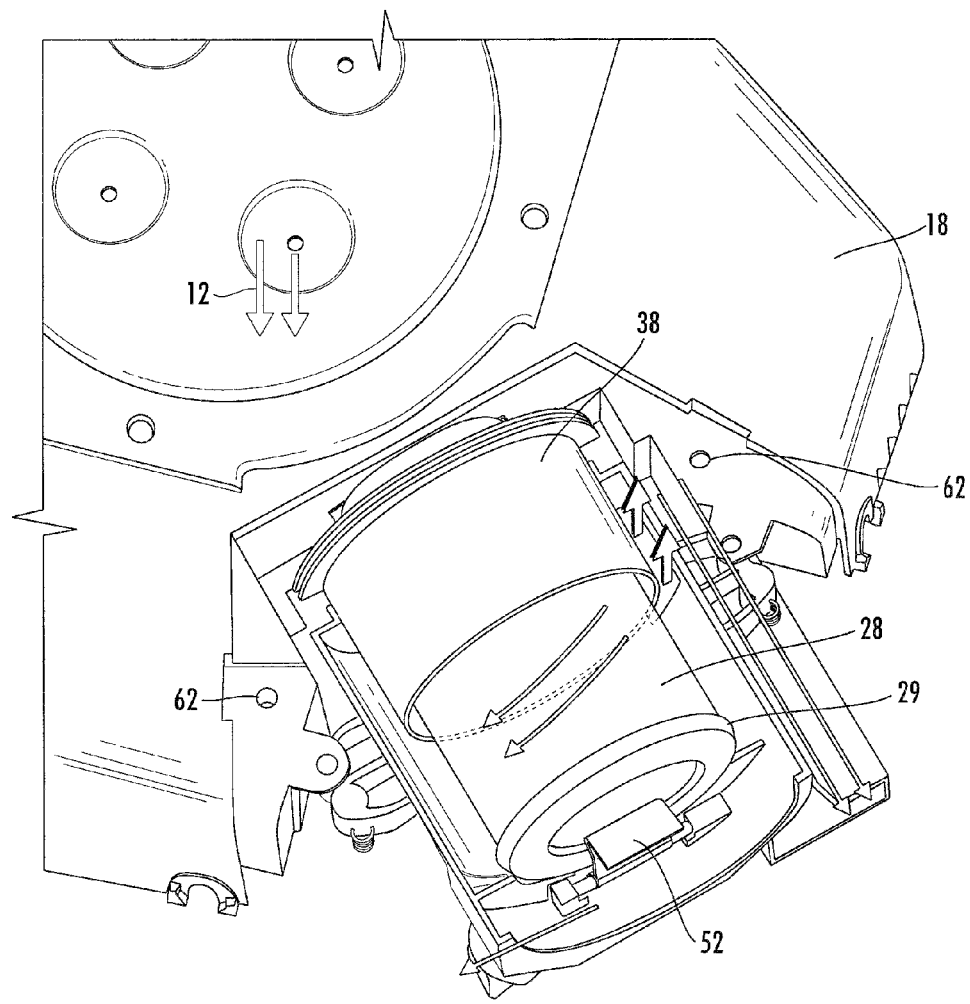
FIG. 5 is a perspective view of the blower housing, including the air cleaner assembly, with the upper filter housing removed.

With further reference to FIGS. 1 and 2, and with additional reference to FIGS. 4 and 5, an air cleaner assembly 20 is disposed within the blower housing 10 and includes an inlet channel 22, an air filter inlet 24, a first debris discharge 26, an air filter element 29, a debris sleeve 38, an elbow 48, a lower filter housing 40, an upper filter housing 46, a scroll 42 and a second debris discharge 32.

Figure 6:
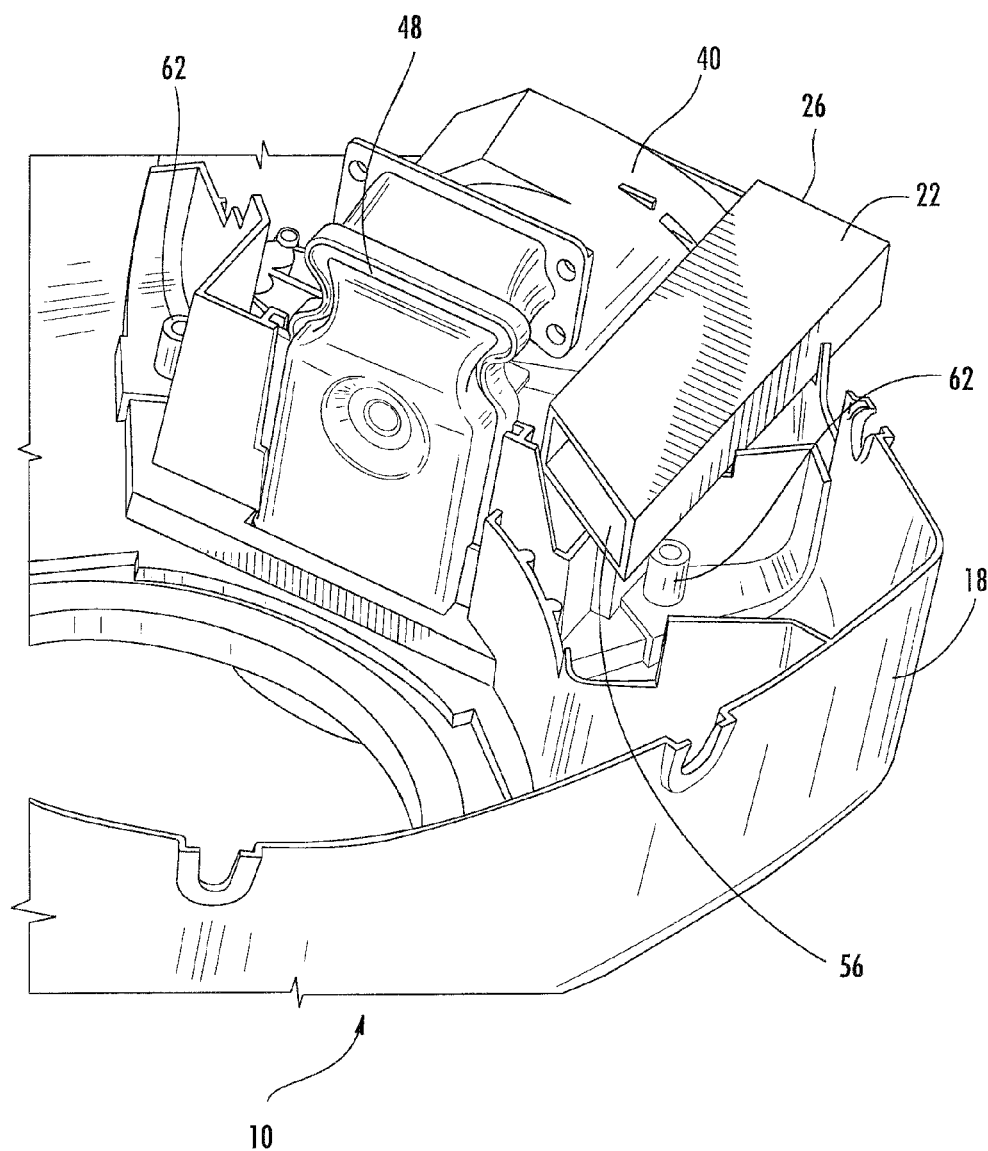
FIG. 6 is a bottom view of the air cleaner assembly.

The air cleaner inlet channel 22 is disposed adjacent to and receives intake air from the cooling fan 16, such that at least a portion of air that has passed through the rotating screen 14 enters the air cleaner assembly 20 by way of the inlet channel 22. A bottom view of the air cleaner assembly 20 in FIG. 6 shows an inlet 56 of inlet channel 22 positioned to receive intake air from the flywheel fan 16. An aperture in the inlet channel 22 near a first axial end 34 of the air filter element forms the air filter inlet 24, although a slot or baffle or any other opening may be used. The axial end of the inlet channel 22 adjacent a second axial end 36 of the air filter element is also provided with an opening, which is the first debris discharge 26. The cylindrical corrugated filter element 29 is positioned horizontally for space efficiency, although it may be positioned vertically or in any other orientation in other constructions. The corrugations of the filter element 29 are not shown in the figures. An optional foam pre-filter, which is a cylindrical sleeve of foam that surrounds the filter element 29, may be included. The debris sleeve 38, best shown in FIG. 5, is a cylindrical member coupled to the first axial end 34 of the air filter adjacent the air filter inlet 24. In other constructions, it may be a partial cylindrical member, i.e., an arcuate member. The elbow 48 is configured to form a path between the filter element 29 and a carburetor intake 64, best shown in FIG. 7, and is coupled to an axial end of the sleeve 38. In a preferred embodiment, the elbow 48 is generally L-shaped and is formed integrally as one piece with the sleeve 38. However, the elbow 48 may be shaped in any way that directs air from an air filter outlet 54 to the carburetor intake 64 and may be formed separately from the sleeve 38 in another construction.

FIG. 4 shows an exploded view of the air cleaner assembly 20. In a preferred embodiment, the inlet channel 22 is formed integrally as one piece with the lower filter housing 40. In another construction, the inlet channel 22 and lower filter housing 40 may be separate pieces. The scroll 42, also preferably formed integrally as one piece with the lower filter housing 40, is a wall on the inner surface of the lower filter housing 40 configured to direct air from the first axial end 34 of the filter element towards the second axial end 36. The second debris discharge 32 is located at the second axial end 36. In a preferred embodiment, the second debris discharge 32 is an aperture configured to be fitted with a duckbill valve 44. A clip 52 is coupled to the lower filter housing 40 to hold the filter element 29 in place. In another construction, any fastener may be used, such as a clamp, a screw, a bale, or a snap-fit between the filter element 29 and the lower filter housing 40. In yet another construction, no fastener may be needed between the filter element 29 and the lower filter housing 40.

Figure 3:
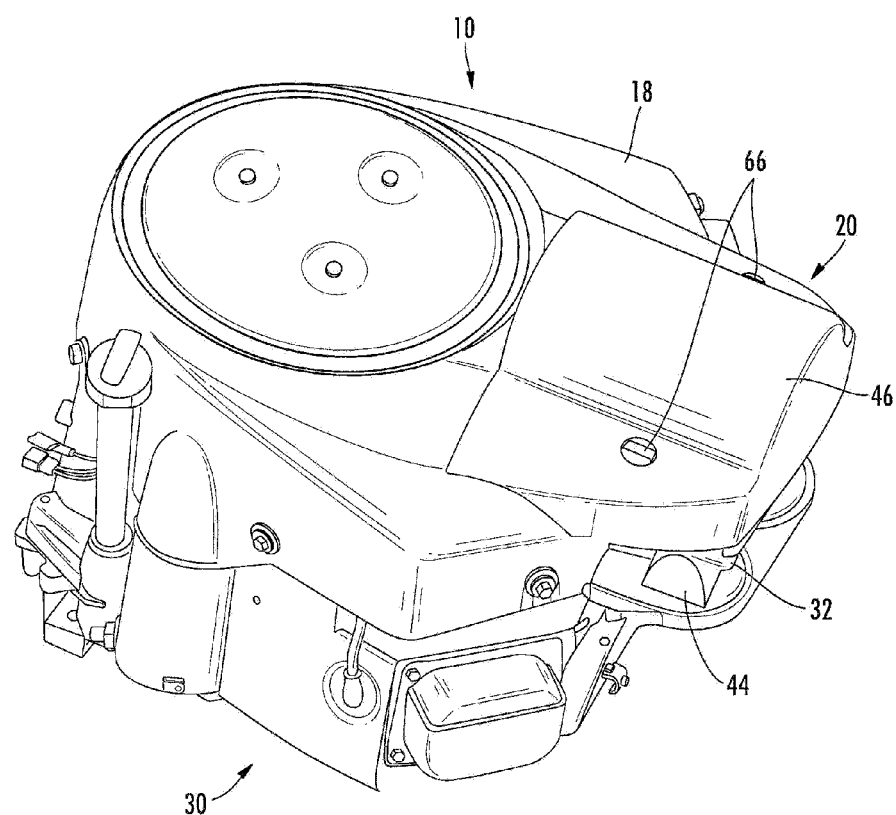
FIG. 3 is a perspective view of the engine package.

FIG. 3 illustrates an air-cooled internal combustion engine 30, including the blower housing 10 and air cleaner assembly 20. The upper filter housing 46 in the form of a removable cover is shown to have quick-disconnect fasteners 66 (shown as thumbscrews) that provide easy access to the air filter element 29 for inspection and replacement thereof. Fastener bosses 62 on the blower shroud 18 corresponding to the quick-disconnect fasteners 66 are shown in FIGS. 4-6. The upper filter housing 46 is removably fastened to the blower shroud 18 via mechanical connection between the quick-disconnect fasteners 66 and the fastener bosses 62.

The flow path of air through the blower housing 10 and air cleaner assembly 20 is indicated by arrows 12 and 13 in FIGS. 1, 2, 5 and 7. Air is drawn into the blower housing 10 by a flywheel fan or other cooling fan 16 via a rotating screen 14, which provides a first source of filtering upstream of the air filter element 29. At least a portion of that air enters the inlet channel 22 via inlet 56. A second source of filtering upstream of the air filter element 29 is provided by the inlet channel 22. The air filter inlet is configured so that air enters the filter compartment (defined by the lower and upper filter housings 40, 46) in a direction substantially normal to the direction of air flow through the inlet channel 22. In this way, heavier debris particles are prevented from entering the filter compartment because they are carried by their momentum straight through the inlet channel 22. An opening at the end of the inlet channel 22 provides the first debris discharge 26.

As air enters the filter compartment through the air filter inlet 24 in a direction substantially normal to the inlet channel 22, it is first met by the sleeve 38 and then the scroll 42, which encourage cyclonic motion of the air and any remaining entrained debris. In other constructions, the sleeve 38 may have grooves or fins or other means that encourage cyclonic motion of the air, equivalent to the scroll 42. A centrifugal force imparted by the cyclonic motion of the air and debris causes the heavier particles (i.e. debris) to migrate towards the inner surfaces of the lower and upper filter housings 40, 46. The debris travels generally cyclonically, or in a helical path, from the first axial end 34 to the second axial end 36. In the absence of the sleeve 38 and scroll 42, air entering at the air filter inlet 24 could pass straight through the filter element 29. Therefore, it is understood that other constructions of the sleeve 38 and scroll 42, or combinations thereof, that prevent the air from passing through the filter near the inlet 24 may exist. In the absence of cyclonic-motion-imparting elements, such as the sleeve 38 and scroll 42, the cyclonic filtering effect would be compromised because of a reduction in the centrifugal force acting on the debris.

Debris exits the air cleaner assembly 20 via a second debris discharge 32 located adjacent the second axial end 36. The second debris discharge 32 is preferably fitted with a duckbill valve 44. As is known to those of ordinary skill in the art, duckbill valves are normally closed one-way valves that open when a positive pressure differential exists between the upstream and downstream sides of the valve. Other one-way valves that would allow the passage of debris only towards the outside of the air cleaner assembly 20 may be used in other constructions. Less preferably, the second debris discharge 32 may have a two-way valve or opening, but this could allow air carrying additional debris to enter the air cleaner assembly 20. Pressure pulses caused by the internal combustion engine 30 result in periodic openings of the duckbill valve 44 during which debris is discharged from the air cleaner assembly 20. With the separation of debris by way of cyclonic motion and the discharge of debris, a third form of filtering is achieved.

Figure 7:
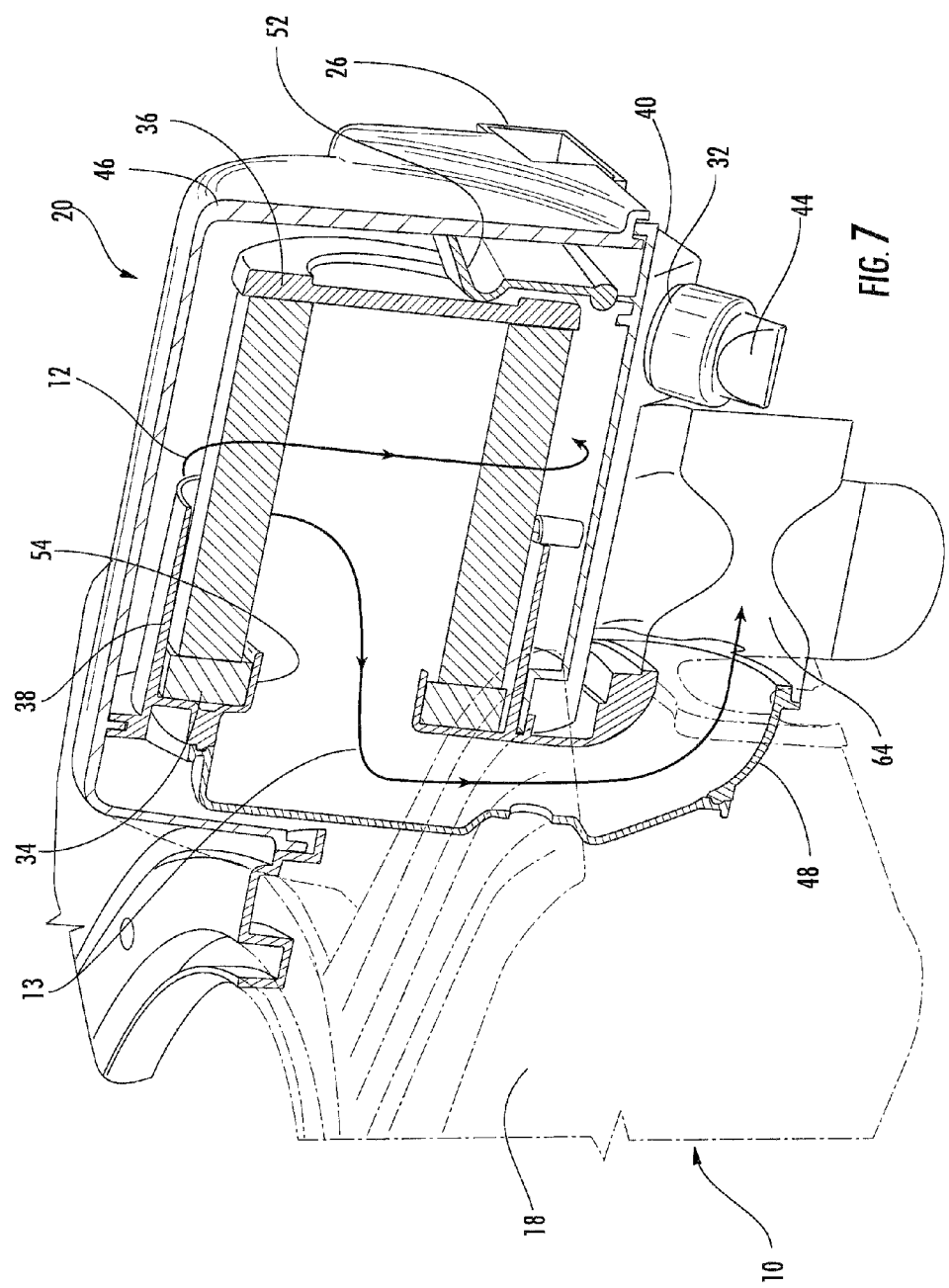
FIG. 7 is a perspective view of the air cleaner assembly including a cross-section of the air cleaner.

Air that passes through the filter element 29 is indicated by arrows 13 in FIG. 7. The filtered air travels generally axially from the second axial end 36 to the first axial end 34 and exits the air filter by way of an air filter outlet 54. The filtered air travels ultimately to the carburetor intake 64 via the elbow 48.

Figure 8:
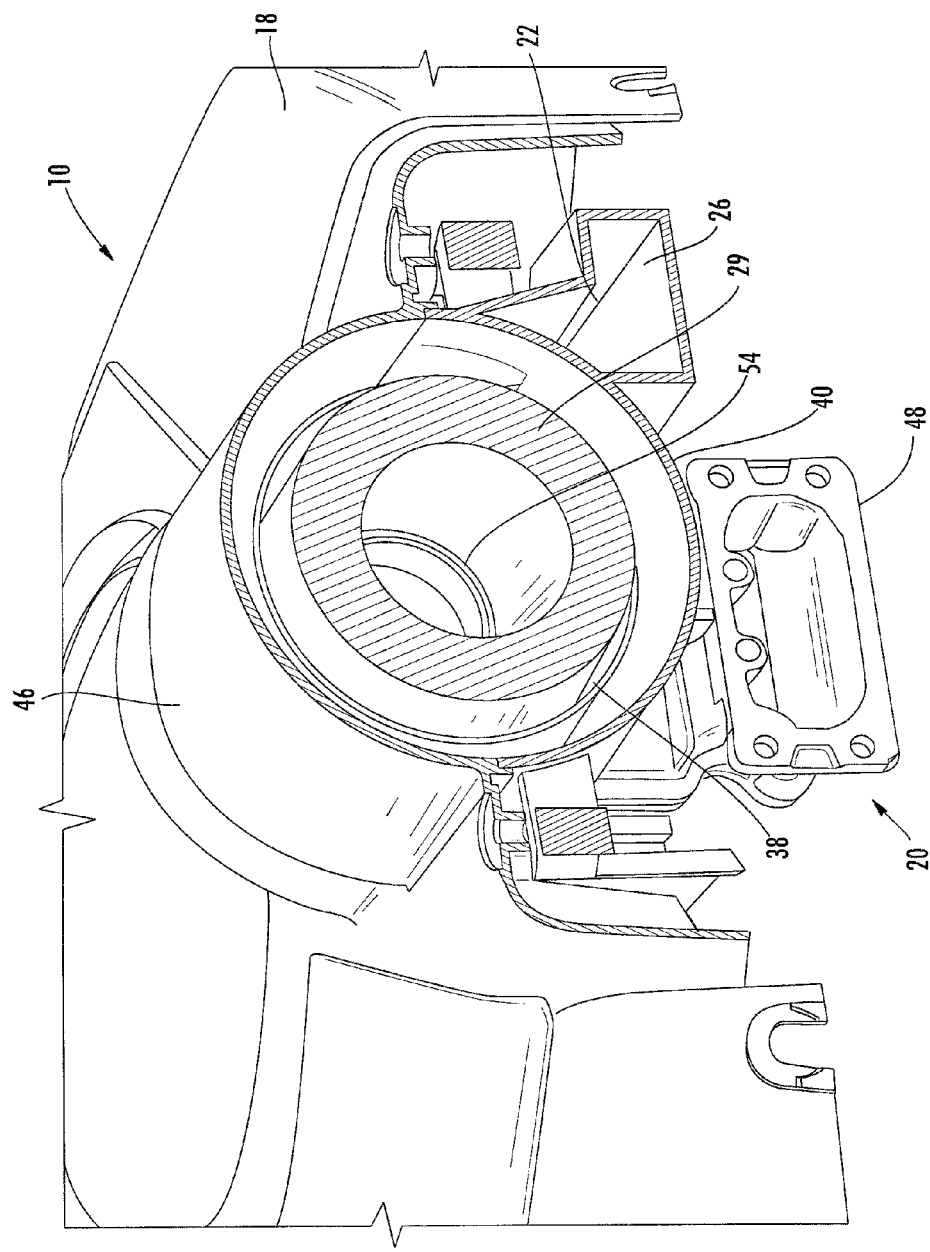
FIG. 8 is a perspective section view of the air cleaner assembly.

FIG. 8 is a perspective view of the air cleaner assembly 20 and blower housing 10, wherein the air cleaner assembly 20 is sectioned perpendicular to its axis. The figure also provides a good view of the air filter outlet 54.

An expected advantage of the first and second upstream filtering steps described above is extended air filter element life. In typical cyclonic air cleaners, grass clippings are not sufficiently prevented from entering the system. Furthermore, grass clippings are not readily discharged through any debris discharge passageways due to their shape and size. As a result, grass clippings tend to accumulate around the air filter element, inhibiting the cyclonic motion of air. The present invention provides a first filtering step upstream of the filter element 29 by way of the rotating screen 14, and a second filtering step upstream of the filter element 29 by way of the configuration of the inlet channel 22. The rotating screen 14 prevents a substantial amount of grass clippings and other debris from entering the system, and the inlet channel 22 encourages any screen-penetrating debris to exit the system via the first debris discharge 26. Thus, grass clippings should be prevented from entering the filter compartment. A third filtering step eliminates most residual debris, which is expected to be substantially free of grass clippings, by way of the centrifugal force imparted by the cyclonic motion of air. Finally, the filter element 29 provides a final filtering step. As the life of a filter depends on the amount of debris trapped within it, the three filtering steps described above are expected to extend the life of the filter by reducing the amount of debris that reaches it.

Additional advantages of the present invention include cost savings. As the air cleaner assembly 20 is a part of the blower housing 10, no separate intake hose or channel is needed. Additionally, no extra brackets, bolts, or other fasteners are needed to fasten the air cleaner to the housing. The elimination of these parts reduces the overall cost of the engine package.

Another advantage of including the air cleaner assembly 20 as a part of the blower housing 10 is that the overall bulk of the engine package is reduced.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
    an internal combustion engine having an air-fuel mixing device;
    a blower fan directing air through a screen to cool the engine; and
    a cyclonic air cleaner assembly receiving air from the blower fan and directing the air towards the air-fuel mixing device;
    a cylindrical filter; and
    one or more structures encouraging helical flow of the air about a cylindrical filter.

2. The apparatus of claim 1 for the comprising a duct having an inlet receiving air from the blower fan and an outlet through which debris is discharged, wherein the cyclonic air cleaner receives air from the duct between the inlet and the outlet.

3. The apparatus of claim 2, wherein the duct extends from the inlet to the outlet in a first direction and wherein the cyclonic air cleaner assembly receives air from the duct in a second direction substantially perpendicular to the first direction.

4. The apparatus of claim 1, wherein the cyclonic air cleaner assembly receives air from the blower fan proximate the first end of the cylindrical filter and wherein the apparatus further comprises a debris discharge outlet proximate an outer circumferential surface of the cylindrical filter and a second end of the cylindrical filter.

5. The apparatus of claim 4 further comprising a one-way valve regulating flow through the debris discharge outlet.

6. The apparatus of claim 5, wherein the one-way valve comprises a duckbill valve.

7. The apparatus of claim 1, wherein the one or more structures comprises a scroll.

8. The apparatus of claim 7, wherein the one of more structures further comprises a sleeve extending along and axial length of the cylindrical filter between the cylindrical filter and the scroll are located such that the air received from the blower fan enters between the sleeve and the scroll.

9. The apparatus of claim 8 further comprising an airflow duct from an interior of the cylindrical filter to the air-fuel mixing device, wherein the duct is integrally formed as a single unitary body with the sleeve.

10. The apparatus of claim 7 further comprising a housing extending along an exterior of the cylindrical filter, wherein the housing is integrally formed as a single unitary body with the scroll.

11. An apparatus comprising:
an internal combustion engine having an air-fuel mixing device;
a blower fan directing air through a screen to cool the engine; and
a cyclonic air cleaner assembly receiving air from the blower fan, directing the air towards the air-fuel mixing device and directing debris through a one-way valve, wherein the cyclonic air cleaner assembly comprises:
a cylindrical filter; and
one or more structures encouraging helical flow of the air about a cylindrical filter.

12. The apparatus of claim 11 for the comprising a duct having an inlet receiving air from the blower fan and an outlet through which debris is discharged, wherein the cyclonic air cleaner receives air from the duct between the inlet and the outlet.

13. The apparatus of claim 12, wherein the duct extends from the inlet to the outlet in a first direction and wherein the cyclonic air cleaner assembly receives air from the duct in a second direction substantially perpendicular to the first direction.

14. The apparatus of claim 11, wherein the cyclonic air cleaner assembly receives air from the blower fan proximate the first end of the cylindrical filter and wherein the debris discharge outlet is proximate an outer circumferential surface of the cylindrical filter at a second end of the cylindrical filter.

15. The apparatus of claim 11, wherein the one or more structures comprises a scroll.

16. The apparatus of claim 15, wherein the one of more structures further comprises a sleeve extending along and axial length of the cylindrical filter between the cylindrical filter and the scroll are located such that the air received from the blower fan enters between the sleeve and the scroll.

17. The apparatus of claim 16 further comprising an airflow duct from an interior of the cylindrical filter to the carburetor, wherein the duct is integrally formed as a single unitary body with the sleeve.

18. The apparatus of claim 15 further comprising a housing extending along an exterior of the cylindrical filter, wherein the housing is integrally formed as a single unitary body with the scroll.

19. The apparatus of claim 11, wherein the one-way valve comprises a duckbill valve.

20. The apparatus of claim 11, wherein the air-fuel mixing device comprises a carburetor.

21. A method comprising:
drawing air through a screen with a fan;
directing a first portion of the air drawn through the screen to cool an internal combustion engine;
directing a second portion of the air drawn through the screen to a cyclonic air cleaner assembly;
directing air from the cyclonic air cleaner assembly to an air-fuel mixing device of the internal combustion engine;
directing debris from the cyclonic air cleaner assembly through a one-way valve; and
directing the second portion of air through an inlet of a duct having a first debris discharge outlet, wherein the second portion of air enters the cyclonic air cleaner assembly between the inlet and the outlet, wherein the cyclonic air cleaner assembly includes a filter and wherein the method further comprises helically directing the second portion of air about the filter.

22. The method of claim 21, wherein the duct extends in the first direction from the inlet to the outlet and wherein the method further comprises directing a second portion of air from the duct into the cyclonic air cleaner assembly in a second direction substantially perpendicular to the first direction.

23. The method of claim 21, wherein the filter is cylindrical and wherein filtered air within an interior of the filter is directed to the carburetor.

24. The method of claim 21, wherein the filter has a first end and a second and, wherein the second portion of air enters the cyclonic air cleaner assembly proximate the first end and wherein the method further comprises discharging debris through a second debris discharge outlet proximate the second end.

* * * * *